Patented Aug. 3, 1954

2,685,150

UNITED STATES PATENT OFFICE 2,685,150

MULCHING PAPER

James W. Linehan, San Francisco, Calif., assignor to Crown Zellerbach Corporation, San Francisco, Calif., a corporation of Nevada No Drawing. Application July 25, 1950,
Serial No. 175,877

1 Claim. (Cl. 47—9)

The present invention relates in general to agricultural mulching of the soil, and, more specifically, to that type of mulching which consists in the covering of the cultivated ground between individual plants with sheet material, particularly, a layer of heavy paper.

Within recent years it has been discovered that heavy paper, such as kraft paper, when treated with oil, can be employed in this manner as a mulching medium with beneficial results. The oiling of the paper not only prolongs the life of the paper itself in the field, but, when such oil as crude petroleum oil is used for treating the paper, it has been observed that the oil treated paper efficiently prevents weed growth and also causes more ground heat and ground moisture to be retained in the soil beneath the oiled paper. In my opinion this prevention of weed growth and retention of ground heat beneath such mulching paper are partly due to the dark color of the oil as well as to the chemical of the composition of the crude oil, since the dark color undoubtedly acts to shut off the light rays from the covered ground, retarding the development of plant life beneath the paper and thus cooperating with the effectiveness of the chemical composition of the oil in stopping weed growth. The dark color also promotes the absorption and retention of heat beneath the paper. This would account in part for the higher ground temperature which has been found to prevail when such oil treated mulching paper has been used.

Mulching paper treated with crude petroleum oil is now beginning to be used quite extensively, for example in pineapple growing. Various experiments convinced me that more efficient results are attainable if a greater amount of crude oil is used in the paper, and further that still better results can be obtained if the oil treated paper is also made substantially black in color and particularly if the paper is rendered opaque.

The kraft paper which is now being used for mulching is not capable of holding the optimum amount of oil which I find desirable for mulching paper. Attempts to increase the amount of oil in the mulching paper have shown that the mulching paper heretofore used is not capable of holding such optimum amount of oil. The heavy kraft paper which is customarily employed as mulching paper reaches a saturation point of oil when the amount of oil by weight is from 40% to 50% of dry fiber weight, whereas I have found that up to twice this amount of oil is desirable. Heretofore if the amount of oil applied to the paper happened slightly to exceed the saturation level, some drainage of oil from the paper would then occur during the shipment or storage of the paper, thus resulting in an undesirable condition. One of the objects of my present invention is to provide an improved oil-impregnated mulching paper which will be capable of holding a larger amount of oil effectively, such as crude petroleum oil.

Another object of my invention is to provide an improved oil-impregnated mulching paper which will be more efficient in absorbing and retaining heat and increasing ground temperature.

A related object is to provide an improved mulching paper which will not only carry a large amount of oil, the chemical characteristics of which act to retard weed development, but which mulching paper will also inhibit weed growth by effectively shutting off the rays of light from the ground.

Oil-treated mulching paper generally and preferably consists of heavy kraft paper treated with crude oil, as previously mentioned, and a very satisfactory oil which is being used for this purpose is the cude oil known to the trade as "Bunker C Fuel Oil." The oil treated kraft paper is manufactured, sold, and shipped in rolls of convenient size; for example, the rolls are customarily about one foot in diameter and approximately three feet in length.

One difficulty I have observed in connection with such rolls of oil-treated mulching paper is that when the mulching paper is unrolled in the spreading of the paper on the ground, there is a strong tendency for the layers of the oiled paper to stick together. Coating of the heavy oil extending over the smooth surface of the paper in each layer of the roll produces a surface tension which makes the unrolling of the paper difficult and frequently results in the breaking of the paper during rapid unrolling of the same. A further object of my invention is to produce an improved oil-treated mulching paper with which this particular difficulty will be practically eliminated.

The breaking or tearing of the mulching paper after it has been laid in the field, or even while it is being laid, is a further well known source of trouble and annoyance. There are several reasons why such breaks occur. If the paper is stretched over rough stones or hard sun-baked clods, these may puncture the paper. The holding down of the edges of the paper with stones, as is frequently done, may also cause tears or punctures. If the row to be covered by the paper is curved, an extra strain is placed on one edge of the paper as it is unrolled and this strain may cause breaks to start in that edge of the paper. If the paper is stretched over the ground too tightly and weighted down along the edges with stones, the shrinkage or contraction of the paper as it is subjected to the alternate effects of hot sun and light rains or dew may be sufficient to produce breaks in the paper. A one thousand foot strip of mulching paper will contract as much as ten to 20 feet during normal exposure and consequently ordinary mulching paper which has been stretched near to the maximum point during the laying of the paper on the ground will crack under the strain of such contraction or shrinkage.

It will be obvious that the breaking or tearing of the paper under any of these conditions will necessitate an additional expenditure of time and labor in covering of such breaks or tears, for if the resulting openings are not taken care of the weed growth will then develop in such places on a very rapid scale. An important object of my invention is to provide an improved mulching paper which will have considerably greater capacity for stretching and thereby reduce the probability of breaks and tears occurring under such conditions as those above indicated.

In carrying out my invention I prefer to use kraft paper of the customary weight and grade heretofore used for mulching paper, thus, for example, paper which might be described as 100% natural kraft paper having a basis weight of 62 to 65 pounds (the basis weight for convenience being figured as the weight of 500 sheets of paper 24" x 36" in size). Other weights and grades of paper, however, can also be used with my invention.

A necessary and most important step in the carrying out of my invention is that the paper used is creped, thus for example, machine creped with a creping doctor in the well known manner, so that the creped paper, after oiling, will have a stretch in the machine direction of from 5% to 10%. The paper, creped in this manner and to the extent indicated, is then impregnated with crude petroleum oil, for example the "Bunker C Fuel oil." The impregnating of the creped paper with oil may be accomplished in various ways but I have found it convenient and satisfactory to use the same equipment as used in waxing paper. Although in the case of the same paper when uncreped, the oil saturation point will be reached when the amount of oil by weight is equal to from 40% to 50% of dry fiber weight of the paper, the creping of the paper will enable approximately twice the amount of oil to be satisfactorily carried by the paper. One reason for this is the fact that the creping of the paper makes its capacity for absorption greater. The minute breaking of the creping sheet fiber structure, as a result of the creping operation, increases the porosity of the sheet and also causes it to be a more adsorptive medium. Another reason why the creped paper will satisfactorily carry this desirable increased amount of the crude oil is the fact that when the oiled creped paper is wound in the customary roll, the creped layers do not contact each other over the entire surface area. Thus the surface tension of the oiled paper in the roll is considerably reduced. This produces a related advantage of facilitating the unrolling of my improved mulching paper in the field.

A specific example of my improved mulching paper, which has been found to be very satisfactory in extended tests, is a creped, oil-impregnated paper made from 100% natural kraft paper having a basis weight (500 sheets 24" x 36") of 62 pounds. The creped paper is impregnated with "Bunker Fuel Oil," thus for example, fuel oil with a viscosity of 160–185 seconds Saybolt at 120° F. and enough of the oil is added to bring the "basis" weight up to 120 pounds. The stretch of the creped paper in the machine direction after oiling approaches 7%. The paper is made up into rolls approximately 12 inches in diameter, the width of the paper being from 34 inches to 36 inches. No oil leakage from the paper in the rolls takes place at any time during the storage, shipping or handling of the rolls. The paper unrolls freely in the field and the paper on the ground conforms to unevenness of the ground and even adapts itself to curved rows on the ground. Instances of breaking or tearing of this paper have been rare and are insignificant in comparison with the breaking and tearing which occurs under similar conditions with the uncreped mulching paper heretofore used.

To the best of my knowledge, all attempts heretofore made to produce a mulching paper which would have less tendency to break or tear under the conditions previously mentioned, have been aimed at making the paper heavier and of higher specific tensile strength, on the theory that this was what was needed in the paper. By specific tensile strength is to be understood the strength of a unit width determined by a standard testing machine. However, I have found that heavier paper and paper of higher specific tensile strength showed high breakage in the field. In the carrying out of my invention I have taken the opposite course inasmuch as the creping in my improved mulching paper tends to lower the specific tensile strength, but I have found that specific tensile strength is of secondary importance when high stretch value is imparted to the paper. In fact, with my invention, I have found that paper of lighter weight and lower specific strength can be satisfactorily used provided the paper is machine creped so as to give the paper a sufficiently greater stretch while also producing an irregular surface in the paper to cause the area of contact of the layers of the oiled paper in the roll to be reduced. Of equal importance also is the fact that the creping makes possible the higher oil absorption per unit weight of fiber.

While the crude oil itself gives a somewhat dark color to the impregnated paper, I have found that further improved results are obtained if dyes are incorporated in the paper to give it a substantially black color. Another advantage is obtained by incorporating an opacifying pigment, such as carbon black, in the furnish for the paper since an opaque paper shuts off from the ground the light rays necessary for weed growth, and a paper which is black in color absorbs a greater amount of heat and thus is instrumental in increasing the temperature of the soil.

The oil-treated creped mulching paper can, if desired, have its wet strength increased by the incorporation of melamine resin in the paper machine furnish. The addition of resin to the furnish increases the ability of the paper to withstand the outdoor exposure to which mulching paper is subjected. For this purpose melamine resin to the amount of 2.5% of the dry weight of the fiber may be incorporated in the furnish, following the customary technique in producing wet strength in paper.

I claim:

An improved mulching paper of the character described for inhibiting weed growth, said mulching paper consisting of a heavy paper, creped substantially throughout its extent, and impregnated, after creping, with a crude petroleum oil inimical to plant growth, the amount of such oil retained in the finished paper being from 60% to 100% by weight of the dry weight of the paper, the creping of the paper serving to provide the necessary increase in the saturation level so as to enable the paper to retain such high amount of the weed-inhibiting oil and thereby enable said mulching paper more effectively to prevent weed growth.

References Cited in the file of this patent

UNITED STATES PATENTS

| Number | Name | Date |
|---|---|---|
| 1,315,362 | Cumfer | Sept. 9, 1919 |
| 1,332,141 | Ohashi | Feb. 24, 1920 |
| 1,534,371 | Finley | Apr. 21, 1925 |
| 1,595,637 | Wheildon | Aug. 10, 1926 |
| 1,844,051 | Allen | Feb. 9, 1932 |
| 1,882,377 | Whittelsey | Oct. 11, 1932 |
| 1,882,713 | Angier | Oct. 18, 1932 |
| 2,029,390 | Rodgers | Feb. 4, 1936 |
| 2,333,959 | Smith | Nov. 9, 1943 |
| 2,345,543 | Wohnsiedler | Mar. 28, 1944 |

FOREIGN PATENTS

| Number | Country | Date |
|---|---|---|
| 696,268 | France | Oct. 13, 1930 |
| 531,118 | Germany | Aug. 5, 1931 |

OTHER REFERENCES

Farmers' Bul. 1307, U. S. Dept. Agr. (Dec. 1931) on "Quack Grass", page 21.

Cross, "Handbook of Petroleum, Asphalt and Natural Gas" pub. 1928 as Bul. 25, Kansas City (Mo.) Testing Lab., page 472.

Porter, "Petroleum Dictionary" (1930), Gulf Pub. Co., Houston, Tex., pp. 94 and 95.